Feb. 21, 1967   J. R. SUCHER ET AL   3,305,618
MOLDING PROCESS
Filed May 20, 1963
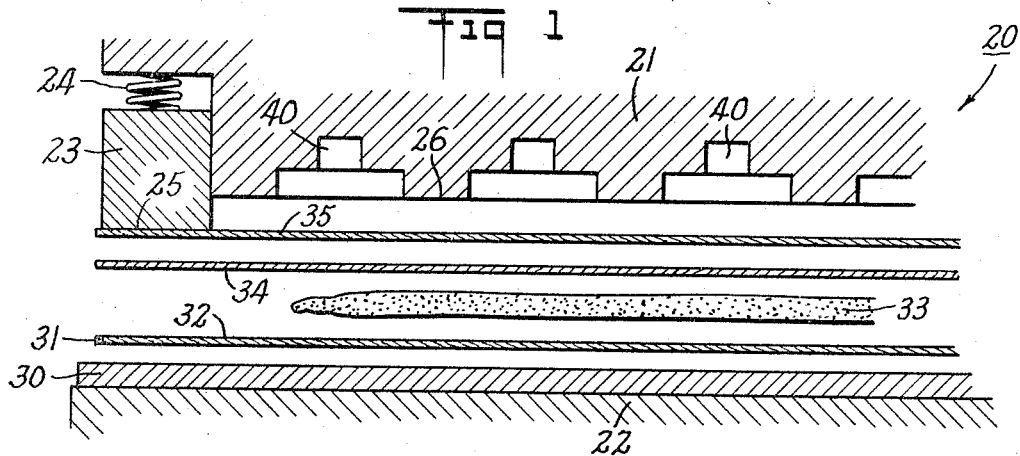
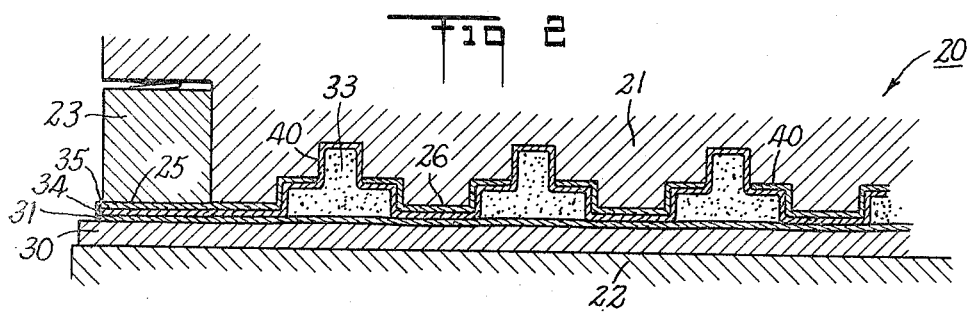
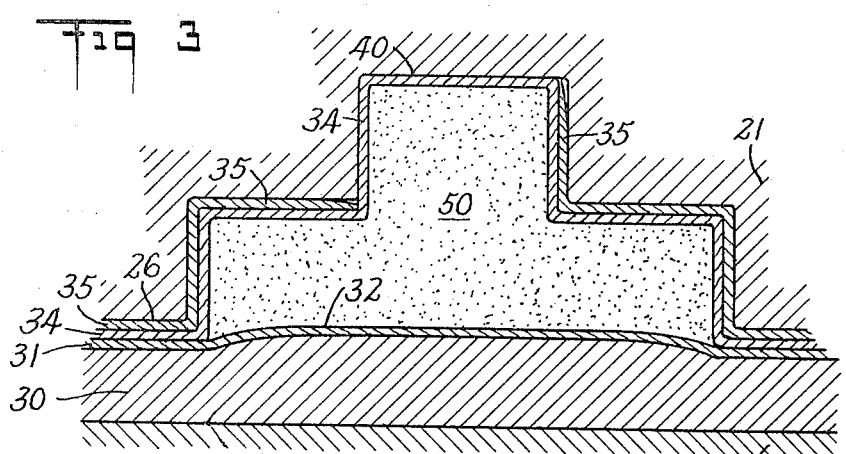
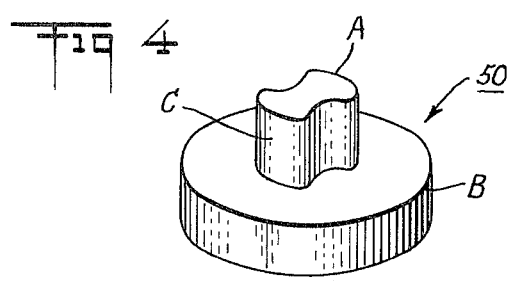
INVENTORS
JOSEPH R. SUCHER
DANIEL A. FISCHLER
BY Mark Basseches
ATTORNEY

United States Patent Office 3,305,618
Patented Feb. 21, 1967

3,305,618
MOLDING PROCESS
Joseph R. Sucher, Woodmere, and Daniel A. Fischler, New Hyde Park, N.Y., assignors, by mesne assignments, to Emsu Company, New York, N.Y., a partnership
Filed May 20, 1963, Ser. No. 281,731
8 Claims. (Cl. 264—316)

This invention relates to a method of molding articles of liquid resinous material and particularly of thermosetting resinous material. Still more particularly, this invention relates to a method of molding a liquid thermosetting resin under heat and pressure to form shaped and cured articles, or article blanks, such as buttons and the like.

Still more particularly, this invention relates to an improved method of molding articles or article blanks from a liquid thermosetting resin composition, such as a polyester resin composition. The invention is particularly applicable to the manufacture of buttons or like articles which are commonly made in gang molds, i.e. molds having a plurality of cavities.

The invention is further especially well adapted to the manufacture of buttons or like articles having incorporated therein a pearly or nacreous filler material oriented to produce in the article an integral sheen or pearly appearance.

In United States Patent No. 2,652,597, issued Sept. 22, 1953 to Sucher, there is disclosed a method of compression molding liquid resinous material in a two-part gang mold, wherein a stretchable film is interposed between the liquid resin and the female cavities of the mold. The mold of said Patent No. 2,652,597 is highly satisfactory and enjoys considerable commercial success in the molding of a very wide variety of articles and article shapes. However, where it is necessary or desired to mold articles having relatively complex shapes or requiring fine or sharp edged angles, or in other applications where it is important that the molded product conform more or less precisely to the cavity shapes, a more exact process is sought.

Until the present, really precise molding of liquid resinous materials in gang molds was not thought possible. The present invention is directed to a process for performing such molding operations.

Basically, in accordance with the present invention, a two part mold, at least one element of which is provided with mold cavities, is employed. The mold is preferably provided with the usual peripheral ring or with other equivalent means, such as the retainer walls set forth in Patent No. 2,652,597, to concentrate or centralize the resin in the area of the mold having the cavities, and create a back pressure in the mold. A thin film of stretchable material, such as cellophone, polyvinyl alcohol, or an equivalent, is placed in registry with the mold part or parts which are provided with cavities. A liner, to prevent adhesion between the resin and the mold part not covered by the first mentioned film, is placed in registry with said uncovered mold part. Where both mold parts include cavities, a stretchable film is placed over each mold part.

A quantity of the thermosetting liquid resin sufficient to fill the cavities to a moderate excess is interposed between the film and the liner or the second film.

The process as described up to this point is substantially in accordance with the teachings of Patent No. 2,652,597 mentioned above.

In accordance with the present improved process, however, a web, sheet or layer of a porous material, as exemplified by paper, thin cloth or the like, is interposed between the cavities and the stretchable film. The mold parts are thereafter closed and the resinous material is subjected to heat and pressure.

Depending upon the draw or depth of the cavities and the nature of the porous web or sheet, the porous sheet may burst or may conform to the cavities. The stretchable film is urged into intimate lining relation with the cavities or with the portions of the paper which line the cavities under the influence of the resin, which sets up or cures under the heat of the mold.

The use of a web or webs of porous material between the stretchable film and the cavities has been found unexpectedly to produce molded products which cleanly and accurately reproduce the contours of the molds to a far greater degree than was heretofore possible in the absence of the web or webs.

Accordingly, it is an object of the invention to provide an improved process for the molding of a thermosetting liquid resin under heat and pressure.

A further object of the invention is the provision of an improved method for molding in a gang mold, buttons or like articles which may or may not contain nacreous filler material to produce buttons or other articles closely conforming to the configurations of the mold.

Still a further object of the invention is the provision of an improved molding process.

To attain these objects and such further objects as may appear herein or be hereinafter pointed out, reference is made to the accompanying drawings, forming a part hereof, in which FIGURE 1 is a vertical section through a molding apparatus for carrying out the process of the invention, the parts being represented in the open or charging condition of the mold.

FIGURE 2 is a view similar to FIGURE 1, in the closed condition of the mold.

FIGURE 3 is an enlarged sectional view of a mold cavity in the closed condition of the mold.

FIGURE 4 is a perspective view of a molded article manufactured by the process of the invention.

In accordance with the invention, there is diagrammatically illustrated in FIGURES 1 and 2, a mold apparatus 20 including an upper mold or die plate 21, and a lower platen or die plate 22. The mold parts 21, 22 are movable toward and away from each other, it being understood that such movement may be accomplished either by an upward movement of the mold part 22, a downward movement of mold part 21, or a combination of such movements. The upper part 21 of the illustrated embodiment is provided with a peripheral ring or frame 23 which is spring pressed, as by a series of peripherally located springs 24, in such manner that the leading face 25 of the frame 23 extends beyond or beneath the plane of the land of flash area 26 of the upper mold part 21.

It will be understood that guide pins (not shown) link the frame 23 to the mold part 21, to permit an axial shifting movement of the frame and upper mold part.

Upon the lower mold part or platen 22, there is preferably disposed a compressible or compactible element 30 which may comprise cardboard or the like. The cardboard layer or layers 30 are not essential to the operation of the process but have been found to provide improved results in certain instances, and also prevent premature curing of the resin by providing an insulating barrier between the lower heated mold part and the resin subsequently charged thereon.

It will be understood that a cardboard layer may similarly be used where the mold or die plate includes cavities of moderate draw, i.e., of a draw which will not cause rupture of the cardboard.

Where a cardboard layer is employedfi a liner 31 having its upper face 32 coated with a parting agent for the resin is disposed between the cardboard and the upper mold section 21. Such parting agents are well known, and in lieu of the coated liner, it is possible to employ a sprayed lubricant, such as silicone oil, applied directly to the cardboard or, if no cardboard is used, then directly to the lower mold section 22. The resin mixture to be molded is deposited on the liner 31.

As an example of a resin mixture which will produce a pearly appearing end product, the following formulation (in parts by weight) is suggested, it being understood that the particular molding formulation employed is a matter of choice only and forms no part of the present invention.

| | Parts |
|---|---|
| Laminac 4120—polyester resin produced by American Cyanamid Co. | 95 |
| Paraplex P 13—flexible polyester resin produced by Rohm & Hass | 5 |
| Pearl Essence—synthetic pearl essence comprising basic lead carbonate lamellae in a suitable dispersing agent available under the trade name "Z.P.G. Nacromer" from the Mearl Corp. | 2½ |
| Luperco A.T.C.—catalyst comprising 50% benzoil peroxide and 50% tricresyl phosphate—Wallace & Tiernan, Inc., Lucidol Division | 2 |

For optimum pearly effect, the above mixture, or at least the resinous components, are, before molding, increased in viscosity by prepolymerizing the same in accordance with the teachings of United States Patent No. 2,643,983, issued June 30, 1953 to Dangelmajer.

It will be understood that the aforementioned formula is representative only, a great variety of suitable thermosetting liquid resins being available for use in the process. Similarly, while a mixture containing a pearly filler material has been exemplified, it will be readily understood that clear, colored or other molding mixtures, with or without pearl filler, may be employed as desired. Also, where orientation of a pigment or filler is not desired, the prepolymerization of the mixture need not be undertaken.

In the practice of the process, it may be convenient to load the resin mixture 33 onto the liner 31 outside of the mold, and for such purposes the liner may be conveniently supported on the cardboard layer 30 which acts as a stiffener. Over the composite, i.e. the cardboard and the coated liner bearing the resin, there is disposed a stretchable film 34, the nature of which film will depend upon the draw or depth of the cavities. For certain applications, i.e. where the depth of the draw is not too great, an uncoated cellophane film may be used. Where a greater draw or cavity depth is encountered, it will be evident that a somewhat more stretchable film, such as a polyvinyl alcohol film may be employed. The thickness of the film or member 34 employed is not critical, it being preferable to use the thinnest film which is capable of being stretched to conform to the cavity shapes without rupture.

Above the membrane 34 there is placed a web or sheet 35 of a porous material, such as tissue paper. A wide variety of paper types have been employed successfully in the process, and for the most part the choice of a particular paper will depend upon cost factors and upon the nature of the article to be molded. Thus, news print, crepe paper, ordinary writing paper, wrapping paper and toilet tissue all have been found satisfactory. On the other hand, non-porous papers, such as wax or resin impregnated paper, have been tried and fail materially to improve the results obtainable without the use of paper.

In normal practice, a thin paper in the order of thickness of about .001 to about .003" is preferred although, as pointed out, these figures are not critical. Crepe paper of an overall thickness of .010" and even greater has been satisfactorily employed, although the nature of this material is such that an overall reticulated pattern is transferred from the paper to portions of the molded articles.

It should be observed that the aggregate which is subjected to molding, i.e. the cardboard, the liner, the resin, the stretchable film and the porous web, may be and preferably is formed outside the mold and thereafter inserted into the mold as a unit. Alternatively, subcombinations, i.e., liner, resin, film and porous web, may be placed between the mold members for processing after assembly outside of the mold area. The method as defined in the appended claims is, accordingly, to be broadly construed as to the order in which the steps are practiced and the environment in which the steps are carried out.

The actual molding is carried out by causing the mold parts 21, 22 to be shifted toward each other. As the mold parts approach, the lower edge 25 of the spring pressed ring 23 clamps a peripheral portion of the porous layer 35, the film 34 and liner 32 against a portion of the cardboard member adjacent the periphery thereof. The clamping of the porous layer is not required and is of no material importance to the success of the molding operation. It will be readily understood that with the continued movement of the mold parts toward each other, a relative movement occurs between the spring pressed ring 23 and the upper mold part 21. As the mold parts approach the final or closed position shown in FIGURE 2, the resin enters the cavities 40 in the upper mold part 21.

The movement of the resin in the manner aforesaid causes a concomitant deformation of the film 34 which ultimately results in causing the film to assume the contours of the cavities. Normally, at some interim position during the closing of the mold, the web or sheet 35 ruptures at a plurality of points, usually in registry with some part of the area of deepest draw of each cavity 40.

At the fully closed position of the mold, the resin in the cavities is subjected to heat and pressure for a period sufficient to achieve a cure.

In processing the herein specified formulation, a heat of 250° to 340° F. applied for about sixty seconds under a pressure of about 1000 pounds per square inch may be used, the exact timing of course being dependent upon the size of the articles to be molded and the resin formulation.

Where a cardboard member is used, as shown at 30 in the illustrated apparatus, a minor portion of the volume of each of the cavities may be occupied by increments of the cardboard. As best seen in FIGURE 3, the penetration of the cardboard into the volume of the cavities causes a slight dishing in the face of the molded article 50, in this instance a shank button. Such slight dishing is normally not objectionable, particularly where the face of the article, prior to use, will be machined away. The additional pressure experienced in each cavity as a result of the use of the cardboard has been determined to result in the production of superior molded articles.

After completion of the molding cycle, the mold parts 21, 22 are opened and the stretchable sheet and liner, with the molded articles encapsulated between these parts, are removed from the press. The articles which in the illustrated embodiment comprise shank buttons, are then separated from these sheets by any convenient means. In practice it has been determined that the heat and pressure of molding causes a partial fusion of the porous layer to the stretchable film and, thus, removal of the film serves also to clear all portions of the porous layer, to prevent fouling of the mold.

It should be understood that the present process is not limited to the use of paper as the porous layer. Rather, certain of the beneficial effects of the invention have been achieved through the use of fabrics and yarns, for instance.

The molded products which result from the practice of the process conform with a high degree of precision to the contours of the mold cavity. The shank button 50, FIGURE 4, for instance, displays a sharp corner or edge at A and a sharply delineated line of separation at B where the side edge of the button joins the rear face. The shank C is fully formed and cleanly joins the rear face of the button without traces of beveled or rounded junctions which are characteristic of articles molded without the use of a porous layer. It has been found the articles molded under conditions identical with those described, with the exception that the porous layer is omitted, do not display the accuracy of conformation to the mold which is characteristic of this process. Thus, the edges A and B may be rounded and the shank C may be relatively imprecise.

Normally, the porous layer chosen should be very thin since, after bursting, portions of this layer will be interposed at random positions between the cavity and the stretchable film (see FIGURE 3). However, the microscopic indentations which may be left in the molded article are of little consequence as compared to the highly improved accuracy with which the article conforms to the dimensions of the mold cavity.

Without limitation thereto and without being bound thereby, it is our theory that the highly improved reproduction in the molded articles of the conformations of the mold results from the ability of the porous layer to conduct entrapped air out of the individual mold cavities.

It is theorized that the rounded parts or portions characteristic in certain articles molded by processes heretofore known, result from the entrapment of minute quantities of air within the individual mold cavities. It is further theorized that the porous layer acts as a conduit, permitting escape or distribution of such entrapped air from the cavities. Thus, as the stretchable film enters the cavity under the pressure of the resin, the porous part or portion is believed to prevent gasketing or sealing of an individual cavity until air has been forced out of the cavity through the medium of the layer itself.

It has been further determined that the beneficial results of the process may be achieved without the use of a continuous sheet or web as the porous layer but, rather, that such results are achieved in substantially full measure if a part of a porous layer is in registry with any part of a cavity. Thus, confetti-like strips of paper were sprinkled on the stretchable film, covering a resin batch, and the batch was molded. Those articles molded in a cavity wherein all or a portion of a bit of paper happened to register with a portion of the cavity conformed accurately to the mold configuration. On the other hand, articles molded in cavities wherein no part of the confetti-like strip registered with the cavity, assumed rounded conformations, particularly at sharp corner portions of the cavities.

From the foregoing it should be noted that the terms "web," "sheet," "layer" and "porous layer" as applied to the porous layer insert are not to be taken in a limited sense but are to be very broadly construed within the meaning of the appended claims, to include a "discontinuous covering."

The process including the porous web, sheet or layer has other advantages as compared to liquid resin molding operations heretofore known. In certain known molding practices, it has been necessary to reopen the mold after initial closure but before final cure and then to reclose the mold to secure a relatively accurate conformation of the article to the mold cavity. Such an operation requires a longer molding cycle, thereby cutting down the production of any press. Also, the constant attention of the operator is required, due to the plural opening and closing steps. Moreover, to permit opening and reclosing of the mold, a lower molding temperature must be used, to prevent premature curing of the molded article. Thus, due to such lower heat, the molding time must be increased, a factor further adding to the cost of practicing the process.

In the process of the invention, the mold, once closed, is not reopened until the articles are completely formed, such forming operations being susceptible of practice at relatively high mold temperatures and thus for short molding cycles.

The insulating properties of the porous layer are a further factor in preventing premature cure of the material (i.e. during the closing of the mold), and for this further reason higher mold temperatures and shorter cycles may be employed, resulting in more economical use of molding facilities.

Where a pearly button is to be produced, the resin composition should be highly viscous, as taught in the aforementioned patent to Dangelmajer, No. 2,643,983, to assure orientation of the pearly filler material. However, where orientation is not a factor, it is possible to mold thinner, less viscous resin mixtures with the present process than with any other process heretofore known. Also, the process creates a lesser percentage of rejects due to improper formation or the presence of bubbles than any other process heretofore known. Final finishing operations are, moreover, greatly simplified, since the article as molded closely approaches any desired shape.

A further advantage of the herein described process is the ability to mold fully formed articles, using a quantity of resin which only slightly exceeds, or in some instances may equal, the volume required for filling the mold cavities. In processes heretofore known, to secure relatively accurate conformation of the articles to the mold, it has been necessary to use a considerable excess of resin. Such requirement arose from the exceedingly great pressures necessary to force the resin and stretchable membrane into approximate lining relation with the cavities, due, in accordance with our theory, to air entrapped between the liner and the cavities. To develop the necessary pressures, a considerable excess of resin was placed between the mold parts, the required pressures being developed during squeezing of the excess resin outwardly beyond the confines of the means employed to restrain migration of the resin, i.e. a spring pressed ring or mating retaining walls.

As the porous web or layer of the present process permits perfect filling of the cavities at far lower pressures than prior processes, preferably only a slight excess of resin need be employed, making the process more economical to practice. In computing the quantity of resin for filling the mold cavities, the thermal expansion of the resin may be taken into account.

While an example of a liquid, thermosetting polyester resin has been given, it should be understood that the usefulness of the process is by no means restricted to use with such composition. Rather, the invention is considered to lie broadly in the procedural steps herein claimed, and other liquid and semi-liquid molding compositions, such as epoxies, thermosetting acrylics, liquid phenolics and the like may be advantageously employed.

Except as indicated in the appended claims, the order in which the steps are carried out is not material to the invention. Particularly it is immaterial whether the composite of resin, liner, stretchable film and porous layer is formed in the mold, or whether this composite is formed outside the mold and charged into the mold as a unit.

Having thus described the invention and illustrated its use, what is claimed as new and is desired to be secured by Letters Patent is:

1. The process of compression molding articles from a liquid thermosetting resin composition in a mold comprising first and second opposed mold parts movable toward each other, said first part having a plurality of mold cavities, comprising the steps of disposing a porous sheet between said mold parts, disposing a stretchable film between said sheet and said second mold part, disposing a quantity of liquid thermosetting resin composition between said film and said second mold part, moving said mold parts toward each other into closed position while resisting migration of the resin from the area between said mold parts, and heating the resin in the closed mold.

2. The process of compression molding articles from a liquid thermosetting resin composition in a mold comprising first and second opposed mold parts movable toward each other, said first part having a plurality of mold cavities, comprising the steps of disposing a porous sheet between said mold parts, disposing a stretchable film between said sheet and said second mold part, interposing a parting means for the resin between said film and the second mold part, introducing a quantity of liquid thermosetting resin composition sufficient to fill said mold cavities between said film and said parting means, moving said mold parts toward each other into closed position while resisting migration of the resin from the area between the film and parting means, and heating the resin in the closed mold.

3. In the process of molding a liquid, thermosetting resin in a two part mold, at least one of which parts has a mold cavity, wherein a stretchable film is caused to conform to the shape of the cavity by pressure applied to the film through the resin, the step of interposing a porous sheet between the film and the cavity in advance of said film being conformed to said cavity.

4. A process in accordance with claim 3 wherein said porous sheet comprises paper.

5. The process of molding articles from a liquid thermosetting resin composition in a mold comprising opposed upper and lower, horizontally disposed mold parts movable toward and away from each other, which comprises the steps of placing a compressible insulating layer on said lower mold part, interposing parting means for said resin between said layer and said upper mold part, interposing a quantity of liquid thermosetting resin composition sufficient to fill said mold cavities between said parting means and said upper mold part, interposing a stretchable film between said resin and said upper mold part, interposing a porous web between said film and said upper mold part, yieldably urging a peripheral region of said film against said parting means to resist escape of the resin beyond said region, shifting said mold parts toward each other under pressure sufficient to cause at least a portion of said layer to enter said cavities, and heating the resin in said cavities.

6. The method of molding a liquid thermosetting resinous composition in a mold having cavities comprising the step of placing a thin porous sheet in registry with said cavities, disposing a stretchable film in registry with said cavities, said film being spaced further from said cavities than said sheet, placing a quantity of liquid thermosetting resin in contacting relation with the surface of said film furthest from said mold, causing said resin to flow into the cavities of said mold under pressure, thereby to cause said film to line said cavities, and heating the resin in said cavities.

7. The method of molding a liquid thermosetting resinous composition in a mold having two parts, at least one of said parts including a cavity, comprising the steps of causing a thin, porous layer to be disposed adjacent said cavity, causing a thin stretchable material to lie adjacent said layer, causing a resinous composition to contact said stretchable material, closing said mold parts to apply pressure to said material through said resin, to cause said material to conform to the configurations of said cavity, and thereafter curing the resin.

8. The process of molding articles from a liquid thermosetting composition in a two part mold having horizontally disposed mold parts movable toward and away from each other, comprising the steps of disposing a compressible insulating layer between said parts, interposing parting means for said resin between one surface of said layer and one said mold part, placing a quantity of liquid thermosetting resin between said parting means and said one mold part, interposing a stretchable film between said resin and said one mold part, interposing a porous web between said film and said one mold part, closing said mold while yieldably resisting migration of said resin from between said mold parts, and thereafter curing said resin.

References Cited by the Examiner
UNITED STATES PATENTS

| | | | |
|---|---|---|---|
| 1,827,127 | 10/1931 | Weamer | 264—316 |
| 1,911,765 | 5/1933 | Mathews | 264—316 |
| 2,962,764 | 12/1960 | Trojanowski. | |
| 3,038,199 | 6/1962 | Bartow | 264—316 |
| 3,075,249 | 1/1963 | Schuer. | |

ROBERT F. WHITE, *Primary Examiner.*

R. B. MOFFITT, *Assistant Examiner.*